United States Patent [19]

Strehler et al.

[11] 4,388,425
[45] Jun. 14, 1983

[54] PRODUCTION OF CONCENTRATES OF TITANIUM DIOXIDE IN POLYCAPROLACTAM

[75] Inventors: Hugo Strehler, Frankenthal; Werner Hoerauf; Guenter Valentin, both of Ludwigshafen, all of Fed. Rep. of Germany

[73] Assignee: BASF Aktiengesellschaft, Fed. Rep. of Germany

[21] Appl. No.: 385,296

[22] Filed: Jun. 4, 1982

[30] Foreign Application Priority Data

Jul. 18, 1981 [DE] Fed. Rep. of Germany ....... 3128476

[51] Int. Cl.$^3$ .............................................. C08L 77/02
[52] U.S. Cl. .................................... 523/333; 524/845; 524/847; 524/879
[58] Field of Search ............... 523/333, 351; 524/845, 524/847, 879

[56] References Cited

U.S. PATENT DOCUMENTS 2,868,757 1/1959 Symons .............................. 524/847

FOREIGN PATENT DOCUMENTS 45-23420 8/1970 Japan ................................... 524/847
46-4188 2/1971 Japan ................................... 524/879

OTHER PUBLICATIONS

Klare's "Synthetische Fasern aus Polyamiden" Akademie-Verlag, Berlin, 1963, p. 170.

Primary Examiner—Lewis T. Jacobs
Attorney, Agent, or Firm—Keil & Witherspoon

[57] ABSTRACT

Concentrates of from 20 to 50% by weight of titanium dioxide in polycaprolactam are produced by a process in which a 5–15% strength by weight aqueous suspension of titanium dioxide is metered into a solution of caprolactam in water at from 100° to 150° C. at the same rate at which water is distilled off, and after the water has been distilled off the resulting mixture is polymerized at from 240° to 280° C.

2 Claims, No Drawings

PRODUCTION OF CONCENTRATES OF TITANIUM DIOXIDE IN POLYCAPROLACTAM

It is frequently desired to produce polycaprolactam delustered with titanium dioxide, in order to spin from this material filaments which have a particularly low luster. For this purpose, it is necessary to incorporate finely divided titanium dioxide into the polymerizing caprolactam melt. The titanium dioxide is introduced into the polymerizing melt as a suspension in water or caprolactam, as disclosed in "Klare synthetische Fasern aus Polyamiden", Akademie-Verlag, Berlin, 1963, page 170. This procedure has the disadvantage that titanium dioxide is readily flocculated by the chain regulator present, leading to nodules in the spun filament. Moreover, the titanium dioxide suspensions used do not have a long shelf life; titanium dioxide is deposited, thus giving suspensions of varying concentration. Attempts have been made to eliminate this disadvantage by adding protective colloids. However, extraneous material is thereby introduced into the polyamide melt, and this is undesirable, particularly when polycaprolactam is used for fiber production.

It is an object of the present invention to provide concentrates of titanium dioxide, which have a long shelf life and a constant concentration, can readily be dispersed in the caprolactam or polycaprolactam melt, and in addition, owing to the omission of water, do not adversely affect the capacity of the polymerization plant.

We have found that this object is achieved by a process for the production of concentrates containing from 20 to 50% by weight of titanium dioxide in polycaprolactam, wherein a 5–15% strength by weight aqueous suspension of titanium dioxide is metered into a solution of caprolactam in water at from 110° to 115° C. at the same rate at which water is distilled off, and after all the water has been distilled off the resulting mixture is polymerized at from 240° to 280° C.

The novel process has the advantage that the titanium dioxide concentrates obtained have long shelf lives and concentrations which remain constant. Further advantages of the novel process are that the titanium dioxide does not flocculate and can readily be dispersed in polymerizing caprolactam, and that the concentrates obtainable according to the invention do not introduce additional water into the polymerization of caprolactam and thus do not adversely affect the plant capacity.

In accordance with the invention, a solution of caprolactam in water is used as a starting material; it advantageously contains from 0.12 to 0.16 part by weight of water per part by weight of caprolactam. The solution is maintained at from 110° to 150° C., in particular from 120° to 140° C.

The aqueous suspension of titanium dioxide used contains from 5 to 15, in particular from 8 to 12, % by weight of titanium dioxide, advantageously of 0.1–0.5 $\mu$m particle size. In addition to titanium dioxide, the aqueous suspension may advantageously contain up to 30% by weight of caprolactam, and up to 0.2% by weight of di-alkali metal phosphate, in particular sodium phosphate, the percentages being based on titanium dioxide. A suitable aqueous suspension of titanium dioxide is obtained, for example, by kneading titanium dioxide powder (rutile or anatase, preferably the latter) with caprolactam in the weight ratio of from 1:0.15 to 1:0.35. From 0.1 to 0.3 part of demineralized water and up to 0.2 part by weight of disodium phosphate, per part of $TiO_2$, are added to the mixture thus obtained, and kneading is continued. The resulting paste contains from 60 to 80% by weight of titanium dioxide, and this content is adjusted with water to 5–15% by weight. The suspension obtained is homogenized, for example by circulatory pumping, and the coarse particles are then permitted to settle out. Thereafter, the aqueous titanium dioxide suspension is decanted from the coarse agglomerates which have settled out.

The aqueous suspension of titanium dioxide is metered into the above solution of caprolactam in water. The amount depends on the desired strength of the concentrate to be produced, and on the strength of the aqueous suspension used. During metering, the solution is maintained at from 110° to 150° C, in particular from 120° to 140° C. The aqueous suspension of titanium dioxide is metered in at the same rate at which water is distilled off. The resulting mixture essentially consists of caprolactam and titanium dioxide, with or without di-alkali metal phosphate, as well as containing small amounts of water, for example up to 10% by weight, based on $TiO_2$. This mixture is advantageously filtered through a 17 $\mu$m sieve.

The mixture thus obtained is then polymerized at from 240° to 280° C. to a relative viscosity of from 1.8 to 2.0. The resulting polymer is extruded as strands and the extrudates are granulated.

Titanium dioxide concentrates obtained according to the process of the invention are suitable for delustering polycaprolactam during its production.

The Example which follows illustrates the process according to the invention.

EXAMPLE

(a) Production of a titanium dioxide suspension 275 kg of titanium dioxide (anatase) of mean particle size 2 $\mu$m and 68 kg of caprolactam are worked for 2 hours at 20° C. in a kneader. Thereafter, 60 kg of demineralized water and 0.1% by weight (based on titanium dioxide) of disodium phosphate $.12H_2O$ are added, and the mixture is kneaded for a further 2 hours. The resulting 68% strength by weight paste is flushed with 2,000 l of demineralized water from the kneader via a turbomixer into a container, and is homogenized by circulating it for one hour. The mixture is left to stand for 48 hours for agglomerates and relatively large titanium particles to settle out, and thereafter the suspension is decanted from the titanium dioxide sediment. The resulting aqueous suspension contains about 11% by weight of titanium dioxide of particle size 0.2–0.9 $\mu$m.

(b) Production of a titanium dioxide concentrate 2,200 l of caprolactam and 350 l of demineralized water are introduced into a pressure-resistant vessel and heated to 130° C. with stirring. A pressure of 1.5 bar develops. 9,000 kg of a 11% strength by weight titanium dioxide suspension prepared according to (a) are metered in over the course of 11 hours, and at the same time water is distilled off continuously. After all the titanium dioxide suspension has been added, the temperature rises to 150° C., thus indicating that the distillation of water has ceased. Thereafter, the mixture obtained, which still contains about 6% by weight (based on titanium dioxide) of water, is filtered through two double sieves of 17 $\mu$m mesh size. The filtered mixture is polymerized for 7.5 hours at 258° C. under a pressure of 7 bar. The melt is then discharged in the form of strands, and these are granulated. The granules contain 31% by weight of titanium dioxide.

We claim:

1. A process for the production of a concentrate of from 20 to 50% by weight of titanium dioxide in polycaprolactam, wherein a 5–15% strength by weight aqueous suspension of titanium dioxide is metered into a solution of caprolactam in water at from 110° to 150° C. at the same rate at which water is distilled off, and after all the water has been distilled off the resulting mixture is polymerized at from 240° to 280° C.

2. A process as claimed in claim 1, wherein the aqueous titanium dioxide suspension used has been obtained by kneading titanium dioxide powder with dry caprolactam, then kneading these materials with the addition of water, with or without the addition of a di-alkali metal phosphate, suspending the resulting paste in water, allowing the coarse titanium dioxide particles to settle out, and decanting the suspension from the sediment.